United States Patent [19]

Mills

[11] 3,896,929

[45] July 29, 1975

[54] MOLDED CASE FOR CASSETTES

[76] Inventor: Thomas C. Mills, 827 Golf Ln., Wheaton, Ill. 60187

[22] Filed: Feb. 14, 1973

[21] Appl. No.: 332,367

[52] U.S. Cl. ................ 206/387; 206/408; 206/475; 206/493; 220/9 R; 220/339

[51] Int. Cl. ........................................... B65d 85/672

[58] Field of Search ........... 206/225, 226, 232, 387, 206/408, 472, 473, 475, 480, 493, DIG. 36; 220/9 R, 16, 31 S; 242/198

[56] References Cited

UNITED STATES PATENTS

| | | | |
|---|---|---|---|
| 2,935,190 | 5/1960 | Braun | 206/408 |
| 3,339,781 | 9/1967 | Schurman et al. | 220/9 R |
| 3,380,581 | 4/1968 | Landgraf | 206/493 |
| 3,593,845 | 7/1971 | Schwartz | 206/DIG. 36 |
| 3,612,432 | 10/1971 | Johnson | 242/198 |
| 3,638,788 | 2/1972 | Solomon | 206/387 |
| 3,640,379 | 2/1972 | Weingarden | 206/387 |
| 3,737,067 | 6/1973 | Palson | 220/31 S X |
| 3,747,745 | 7/1973 | Esashi et al. | 206/387 |

FOREIGN PATENTS OR APPLICATIONS

| | | | |
|---|---|---|---|
| 1,121,765 | 7/1968 | United Kingdom | 206/397 |

*Primary Examiner*—William I. Price
*Assistant Examiner*—Steven E. Lipman
*Attorney, Agent, or Firm*—Molinare, Allegretti, Newitt & Witcoff

[57] ABSTRACT

A molded case for cassettes includes an outside wall and a parallel, separate inside wall. The inside wall includes a number of slots into which cassette brackets may slide. The reels of a tape cassette engage studs extending from the brackets to tighten the brackets in the slots. The studs also prevent the reels of the cassette from unwinding.

9 Claims, 10 Drawing Figures

MOLDED CASE FOR CASSETTES

BACKGROUND OF THE INVENTION

This invention relates to an improved container for storing and transporting tape cassettes. Sound recordings on tape cassettes are becoming increasingly used not only for entertainment purposes, but also for educational purposes. Typically, a tape cassette is comprised of a pair of spaced tape reels mounted in a plastic cartridge with the tape passing through a guide channel situated along one side of the cartridge between the reels. The cartridge encapsulates the reels protecting them and also serving as the mounting means for the reels. The cartridge may thus be easily inserted into a tape playing apparatus.

With the increasing proliferation of such tape cassettes or cartridges, it has also become increasingly important to devise adequate means for storage and transportation of the cassette. Prior art structures relating to the storage of tape reels, cassettes and cartridges include Schoenmakers U.S. Pat. No. 3,272,325 and Elliott et al U.S. Pat. No. 3,487,919. Both of these patents disclose containers which serve to protect the cassettes and provide access to the cassettes as required.

With the advent of increasing use of tape cassettes for educational purposes, it also has become necessary to supplement the cassettes with instruction booklets and other supplemental reading materials to be used in conjunction with the cassettes. Thus, it has also become necessary to devise containers not only which will transport, protect and store tape cassettes, but also which will include written materials for use in conjunction with the cassettes.

It is these functions and uses which the present invention provides.

SUMMARY OF THE INVENTION

In a principal aspect, the present invention comprises a container for tape cassettes. The container includes at least one shell having an outside wall and a generally parallel spaced inside wall made of a flexible material. At least one slot is provided through the inside wall for receipt of cassette mounting bracket means. The mounting bracket means is slidably positionable in the slot. Thus, the bracket means may be removed when desired. The bracket means includes studs which are adapted to engage the hub of reels associated with a tape cassette.

It is thus an object of the present invention to provide an improved container for transportation of tape cassettes.

It is a further object of the present invention to provide an improved container for tape cassettes wherein cassette gripping means associated with the container are removable so that printed material or other material may be carried in the container.

One further object of the present invention is to provide an improved container for tape cassettes wherein the container includes means for grasping the reels associated with the tape cassettes to prevent undesired rotation of the reels.

Still another object of the present invention is to provide a durable container for tape cassettes which is of simple construction and easy to manipulate and use.

These and other objects, advantages and features of the present invention will be set forth in the detailed description which follows.

BRIEF DESCRIPTION OF THE DRAWING

In the detailed description which follows, reference will be made to the drawing comprised of the following FIGURES.

DESCRIPTION OF THE PREFERRED EMBODIMENT

Figure 1:
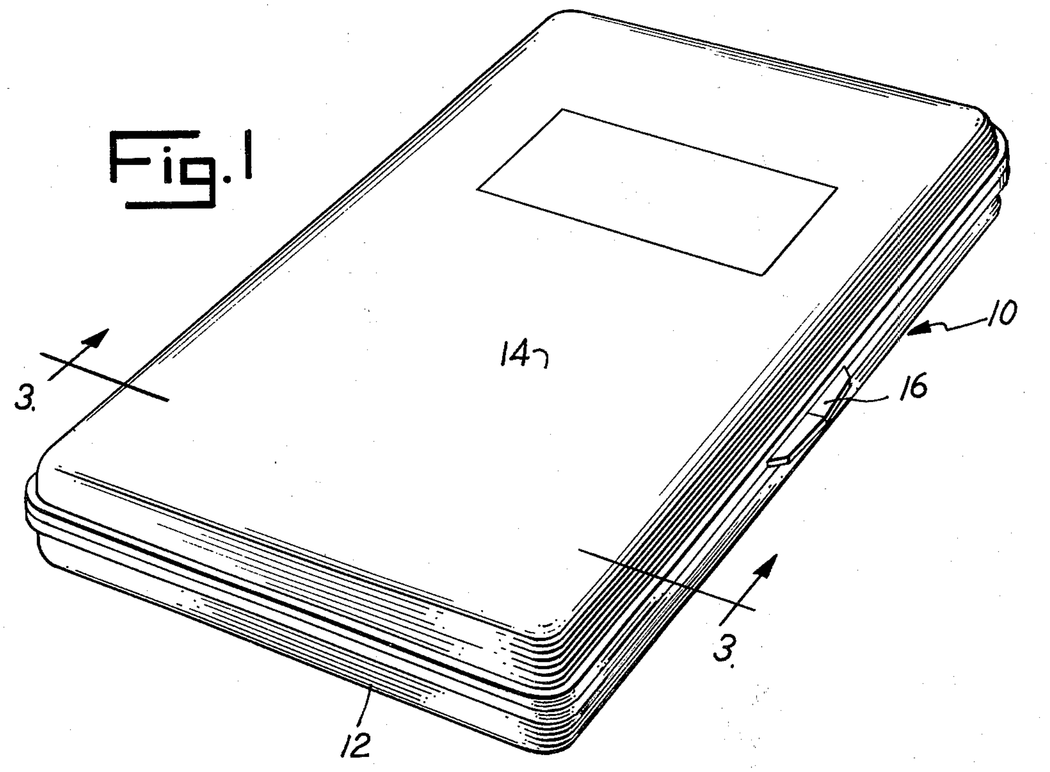
FIG. 1 is a perspective view of a preferred embodiment of the container of the invention wherein the container is in the closed position.
Figure 2:
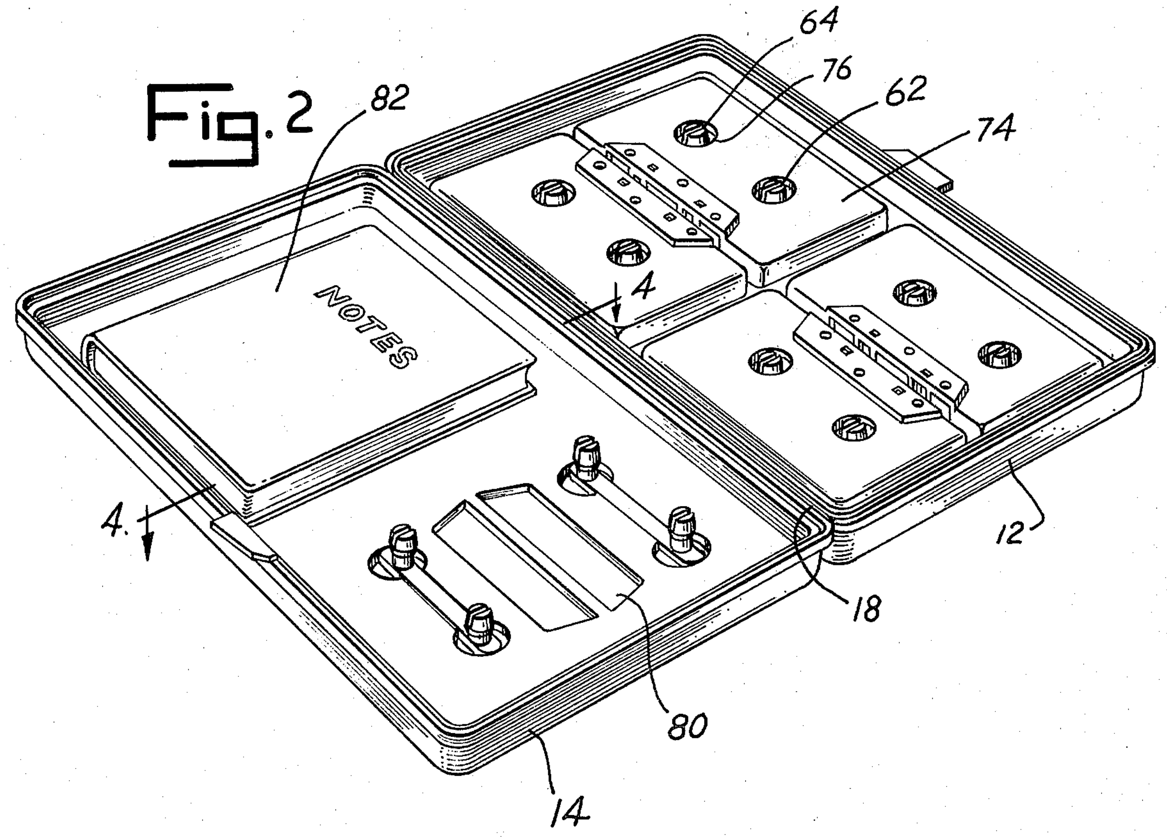
FIG. 2 is the container of FIG. 1 wherein the container is open for access to the inside.

In FIG. 1, the container 10 of the invention is illustrated as having a lower half shell 12 and an upper half shell 14 fastened together on one side by a snap fastener 16. The sides of the shells 12 and 14 opposite from the fastener 16 are connected by a continuous flexible hinge 18 as shown in FIG. 2. Preferably, the entire container 10 is blow molded from a plastic material so that the hinge 18 and fastener 16 is integrally molded therewith.

Figures 3, 4:
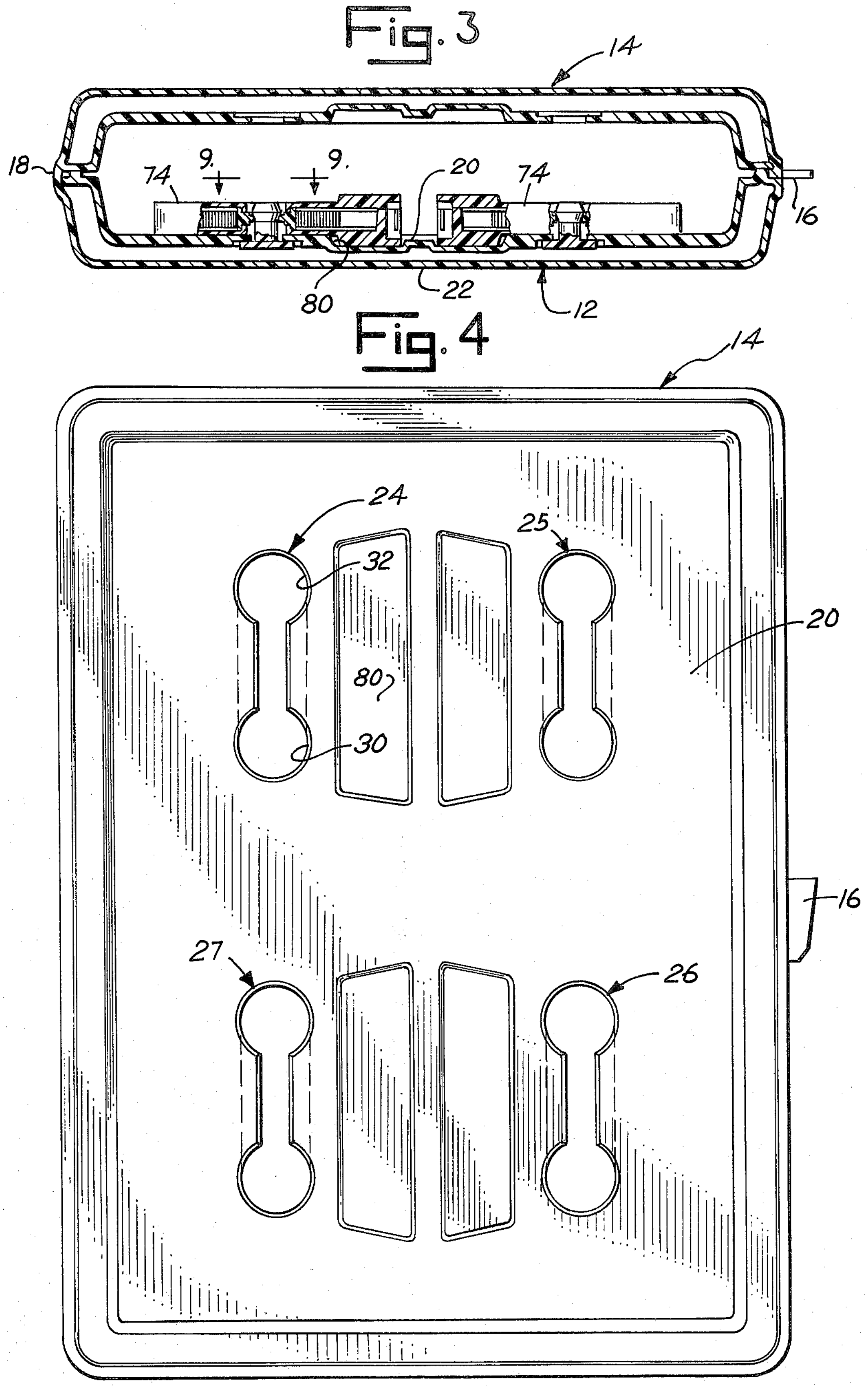
FIG. 3 is a cross-sectional view taken along the line 3—3 in FIG. 1.
FIG. 4 is a top plan view of the container of the invention taken along the line 4—4 in FIG. 2.

FIGS. 2, 3 and 4 illustrate the interior construction of the shells 12 and 14. The following discussion will be directed to only one of the shells 12 or 14 since they are substantially mirror images of each other. Of course, alternative constructions as discussed below are possible.

In any event, as shown in FIG. 3, the shell 12 includes an inner wall 20 and an outer wall 22. The walls 20 and 22 are spaced from one another and are generally parallel to each other. Thus, there is a hollow portion between the walls 20 and 22 which defines an air space, the walls themselves defining half of the container 10.

The inner wall 20 is made from a flexible material such as a plastic material. In the preferred embodiment, since the entire container is blow molded from a plastic material, both the inner wall 20 and the outer wall 22 are of the same material.

As illustrated in FIG. 4, a plurality of slots 24, 25, 26 and 27 extend through the inner wall. The following description will relate to only one of these slots since they are all substantially identical.

Slot 24 includes opposite wide end portions 30 and 32 which extend completely through the inner wall 20. The wide end portions 30 and 32 are connected together by an intermediate portion 34. The intermediate portion 34 also extends completely through the inner wall 20; however, the intermediate portion 34 is not as wide as the wide end portions 30 and 32.

Figures 5, 6:
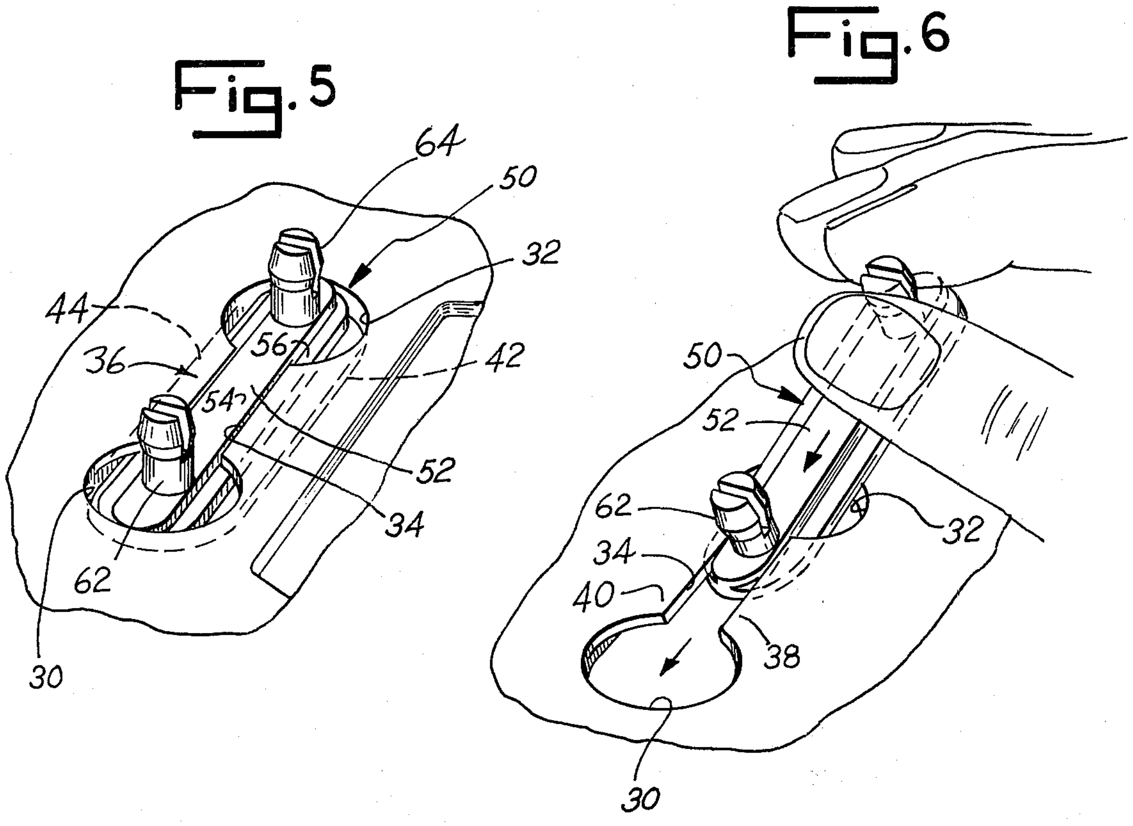
FIG. 5 is a perspective view of the cassette mounting bracket means incorporated as part of the invention.
FIG. 6 is another perspective view of the cassette mounting bracket means illustrating the manner in which it is inserted or removed from the container of the present invention.
Figure 7:
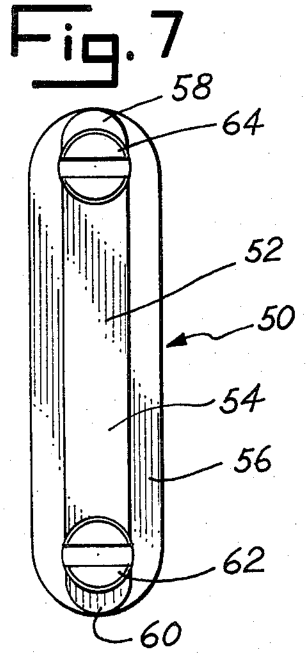
FIG. 7 is a top plan view of the cassette mounting bracket means.
Figure 8:
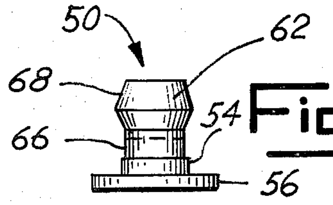
FIG. 8 is an end view of the cassette mounting bracket means.

The construction of the slot 24 is more fully illustrated in FIGS. 5 and 6. There, it is shown that the intermediate portion 34 has an upper planar section 36 comprised of flanges 38 and 40 which extend outwardly from wall sections 42 and 44 respectively. Sections 42 and 44 connect the wide end portions 30 and 32. The purpose of the flanges 38 and 40 will become more apparently in view of the description below of a cassette mounting bracket.

FIGS. 5–10 disclose a cassette mounting bracket 50. The bracket 50 includes an elongated member 52 consisting of an upper planar portion 54 and a lower planar portion 56. Portions 54 and 56 are integrally molded together as part of the bracket 50. Thus, the elongated member 52 has a configuration which is complementary with the slot 24 and in particular the intermediate portion 34 of the slot 24.

In other words, the width of the upper planar portion 54 is substantially equal to the distance between the flanges 38 and 40. This prevents transverse movement of the bracket 50 as it is positioned in the slot 24. Another way of preventing transverse movement of the bracket 50 is to maintain the width of the lower planar portion 56 substantially equal to the distance between wall sections 42 and 44. The preferable method is illustrated in the Figures, however, since it is easier to put the bracket 50 in a slot as at 24 when the upper planar portion 54 has a width substantially equal to the distance between the flanges 38 and 40.

The elongated member 52 has a longitudinal dimension substantially equal to the maximum distance of separation of the outside ends of the wide end portions 30 and 32. In this manner, the outer ends 58 and 60 of the elongated member 52 engage the inner surface of the wide end portions 30 and 32 and maintain the bracket 50 in a substantially fixed position as illustrated in FIG. 5.

Extending upwardly from the bracket 50 is a pair of studs 62 and 64. Each stud 62 and 64 is integrally molded to the bracket 50. These studs 62 and 64 are spaced in order to simultaneously fit through both hub or reel openings 76 of each cassette cartridge. This relationship is illustrated in FIG. 2 wherein studs 62 and 64 are shown to be positioned through the openings 76 to hold a cartridge 74 in position within the shell 12.

Each stud 62 and 64 is comprised of a lower cylindrical portion 66 and a tapered cam portion 68. A slot 70 is provided in the top of the stud 62 and 64 to permit flexibility of the portions of the stud 62 and 64 on the side of the slot 70 and thus facilitate access of the stud 62 and 64 through the center or hub 77 of a cassette reel. This is illustrated in FIGS. 9 and 10.

Figure 9:
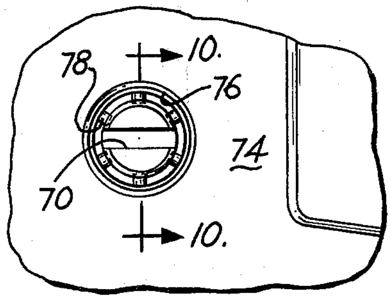
FIG. 9 is a top plan view of a cassette as maintained in position by cassette mounting bracket means taken substantially along the line 9—9 in FIG. 3.
Figure 10:
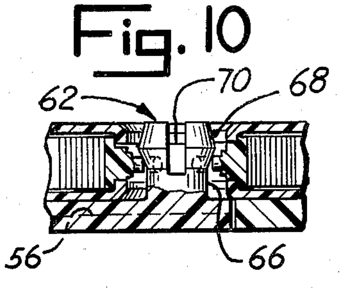
FIG. 10 is a cross-sectional view of the cassette mounting bracket means taken along the line 10—10 in FIG. 9.

Referring to FIGS. 9 and 10, a cassette or tape cartridge 74 includes a pair of reels therein, one of which is illustrated. An opening 76 in the cartridge 74 permits insertion of the stud 62 through the hub 77 of the reel. The tapered surface 68 of the stud 62 engages teeth 78 projecting from the hub 77 of the reel.

The tapered cam portion 68 engages teeth 78 and tends to pull or draw the bracket 50 toward the cartridge 74 against the force of flanges 38 and 40 on the lower planar portion 56 of the bracket 50. In this manner, the cassette 74 is maintained tightly within the container of the invention. An additional advantage of this construction is that the teeth 78 of the cassette reels are rigidly grasped by the tapered cam portion 68, thus preventing undesirable rotation or unwinding of the reels.

The advantages and uses of this invention are illustrated by FIG. 6. Because of the construction of the bracket 50, as described above, in combination with the construction of the shells 12 and 14, it is possible to insert the leading edge of a bracket member 50 into one of the wide end portions 30 and 32 of a slot 24 and then slide the bracket under the flanges 38 and 40 so that the bracket 50 will assume the position shown in FIG. 5. Since the inner wall 20 is made of a flexible material, it is possible to slightly bend the flanges 38 and 40 in order to insert the bracket member 50. Reversing the process removes the bracket member 50.

Removal of the bracket member 50 may be desirable in order to insert reading materials or the like in a portion of the container. This use of the invention is illustrated in FIG. 2, wherein a booklet 82 is shown to be inserted in a position normally occupied by a pair of brackets mounted in slots. Of course, it is possible to utilize any combination of slots, slot shapes, brackets and bracket shapes positioned at various intervals within a container. Thus, the invention is not limited to the two stud construction illustrated in the drawing.

For example, the studs may be threaded into openings defined in the shell walls. However, since blow molding techniques do not provide as dimensionally reproducible items as injection molded items, the illustrated stud construction is preferred. That is, the stud means is injection molded. It, therefore, is dimensionally reproducible so that it can engage the spaced reels of a tape cassette. Such spacing tolerances are not as likely to be satisfied if the studs where threaded separately into threaded, spaced openings in a blow molded shell.

Nor is the invention limited to the particular configuration and placement of the slots in a double walled container. That is, the slot for holding the stud means could be molded in a single wall, or slots could be defined in a single wall and straps could prevent the stud means from falling through the slots. The invention is therefore to be limited only by the scope of the following claims and their equivalents.

What is claimed is:

1. A container for tape cassettes comprising, in combination:

a first wall of flexible material, at least one slot in said wall with a wide end portion connected to a relatively narrow intermediate portion;

a second wall opposed to and spaced from the first wall and the slot; and a separate cassette mounting bracket in said slot, said bracket including an elongated member with a bottom surface, said elongated member having a width intermediate the width of said wide end portion and said intermediate portion of said slot, said elongated member being inserted in said slot through said wide portion for maintenance between said walls by the intermediate portion of said slot, said elongated member having a length less than the length of the slot, said bracket also including a cassette reel engaging stud projecting outwardly from said elongated member and extending from said slot for engagement with a tape reel.

2. The improved container of claim 1 wherein the opposite ends of said slot are wide end portions.

3. The improved container of claim 1 including a plurality of slots and cooperating brackets.

4. The improved container of claim 1 wherein said elongated member includes a top planar section having a width substantially equal to the width of the intermediate portion of the slot.

5. The improved container of claim 1 including first and second spaced reel engaging studs on said elongated member for simultaneously engaging spaced reels of a cassette.

6. The improved container of claim 1 wherein the length of said elongated member is substantially equal to the length of said slot and wherein the ends of the slot are stops for sliding movement of the bracket.

7. The improved container of claim 1 wherein said stud includes a tapered, circumferential flange portion for engaging said reel and tensioning said bracket in the slot.

8. The improved container of claim 1 wherein said first wall is the inside wall of a blow molded, double wall shell and said second wall is the outside wall of said shell.

9. The improved container of claim 1 wherein said stud includes a flange portion for insertion through the hub of a cassette reel, said flange portion frictionally engaging said hub to prevent rotation thereof.

* * * * *